United States Patent
Rossberg et al.

(10) Patent No.: US 11,745,288 B2
(45) Date of Patent: Sep. 5, 2023

(54) PRESSURE MEASURING DEVICE HAVING A MEMBRANE EDGE AND MOUNTING ELEMENT CONNECTED BY A DIFFUSION WELD

(71) Applicant: Endress+Hauser SE+Co. KG, Maulburg (DE)

(72) Inventors: Andreas Rossberg, Bad Säckingen (DE); Anh Tuan Tham, Berlin (DE); Elke Schmidt, Bad Säckingen (DE); Nils Ponath, Lörrach (DE); Jonas Conradt, Berlin (DE); Yanli Wang, Grenzach-Wyhlen (DE); Thomas Uehlin, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 382 days.

(21) Appl. No.: 17/251,407

(22) PCT Filed: May 23, 2019

(86) PCT No.: PCT/EP2019/063406
§ 371 (c)(1),
(2) Date: Dec. 11, 2020

(87) PCT Pub. No.: WO2019/238383
PCT Pub. Date: Dec. 19, 2019

(65) Prior Publication Data
US 2021/0237195 A1    Aug. 5, 2021

(30) Foreign Application Priority Data
Jun. 14, 2018    (DE) .................... 10 2018 114 300.1

(51) Int. Cl.
*B23K 20/02*    (2006.01)
*B23K 20/233*    (2006.01)
(Continued)

(52) U.S. Cl.
CPC .......... *B23K 20/026* (2013.01); *B23K 20/233* (2013.01); *C04B 37/021* (2013.01);
(Continued)

(58) Field of Classification Search
None
See application file for complete search history.

(56) References Cited

U.S. PATENT DOCUMENTS 5,750,899 A * 5/1998 Hegner ................... G01L 19/14
73/756
9,631,994 B2 * 4/2017 Ponath .................. G01L 9/0075
(Continued)

FOREIGN PATENT DOCUMENTS

CN    105308426 A    2/2016
CN    107096994 A    8/2017
(Continued)

*Primary Examiner* — Octavia Davis Hollington
*Assistant Examiner* — Jermaine L Jenkins
(74) *Attorney, Agent, or Firm* — Christopher R. Powers; Endress+Hauser (USA) Holding, Inc.

(57) ABSTRACT

A pressure measuring device includes a ceramic pressure sensor including a ceramic measuring membrane and a sensor mounting configured to secure the pressure sensor such that a membrane region of the measuring membrane surrounded by a membrane edge is contactable with a medium having a pressure to be measured. The sensor mounting includes a titanium or titanium alloy mounting element including an opening through which the membrane region is contactable with the medium. The membrane edge is connected directly with the mounting element by a diffusion weld produced by a diffusion welding method.

15 Claims, 2 Drawing Sheets

(51) Int. Cl.
    *C04B 37/02*     (2006.01)
    *G01L 9/00*     (2006.01)
    *G01L 13/02*     (2006.01)
    *G01L 19/14*     (2006.01)
    *B23K 103/18*     (2006.01)
    *B23K 101/36*     (2006.01)
    *B23K 103/00*     (2006.01)
    *B23K 103/14*     (2006.01)

(52) U.S. Cl.
    CPC .......... *G01L 9/0075* (2013.01); *G01L 13/025* (2013.01); *G01L 19/147* (2013.01); *B23K 2101/36* (2018.08); *B23K 2103/14* (2018.08); *B23K 2103/18* (2018.08); *B23K 2103/52* (2018.08); *C04B 2237/343* (2013.01); *C04B 2237/403* (2013.01)

(56) References Cited

U.S. PATENT DOCUMENTS

| | | |
|---|---|---|
| 2004/0012942 A1 | 1/2004 | Bjoerkman et al. |
| 2008/0110269 A1 | 5/2008 | Strietzel et al. |
| 2012/0258322 A1* | 10/2012 | Berlinger ............... C04B 37/006 228/121 |
| 2015/0101415 A1* | 4/2015 | Kopp ..................... B23K 31/02 65/36 |
| 2016/0003700 A1* | 1/2016 | Jacob ................. G01L 19/0645 73/431 |
| 2017/0030787 A1 | 2/2017 | Buck et al. |
| 2019/0078956 A1* | 3/2019 | Knoll ....................... G01L 9/12 |

FOREIGN PATENT DOCUMENTS

| | | |
|---|---|---|
| DE | 10227479 A1 | 1/2004 |
| DE | 10334854 A1 | 3/2005 |
| DE | 112007002372 A5 | 9/2009 |
| DE | 112007002372 B4 | 9/2009 |
| DE | 102011004729 A1 | 2/2011 |
| DE | 102016204511 B3 | 3/2017 |
| EP | 1329960 A1 | 7/2003 |
| EP | 2860505 A1 | 4/2015 |

\* cited by examiner

PRESSURE MEASURING DEVICE HAVING A MEMBRANE EDGE AND MOUNTING ELEMENT CONNECTED BY A DIFFUSION WELD

CROSS-REFERENCE TO RELATED APPLICATIONS

The present application is related to and claims the priority benefit of German Patent Application No. 10 2018 114 300.1, filed on Jun. 14, 2018 and International Patent Application No. PCT/EP2019/063406, filed on May 23, 2019, the entire contents of which are incorporated herein by reference.

TECHNICAL FIELD

The present disclosure relates to a pressure measuring device including a ceramic measuring membrane and a sensor mounting such that a membrane region is contactable with the medium having the pressure to be measured. The present disclosure relates also to a method for producing such a pressure measuring device.

BACKGROUND

Pressure measuring devices of the above-mentioned type are applied in industrial measurements technology for metrological registering of pressures.

Pressure sensors are regularly categorized corresponding to their dimensions and to the method used for their manufacture into so-called classical sensors and sensors embodied as sensor chips.

Sensor chips are micro-electromechanical system (MEMS) sensors, which are produced usually by applying methods conventional to semiconductor technology, such as, e.g., etching processes, oxidation methods, implantation methods, bonding methods and/or coating methods, using one or multi-ply wafers. Pressure sensors embodied as sensor chips have usually overall dimensions of one to a few millimeters and use measuring membranes having a membrane thickness of a few micrometers.

In contrast, classical pressure sensors have usually overall dimensions of several centimeters and are, as a rule, made as single unit manufactures. In such case, ceramic pressure sensors comprise usually a measuring membrane of a polycrystalline ceramic, which is connected by means of a joint, such as, e.g., an active hard soldered or brazed joint, to a base body composed, as a rule, likewise of a polycrystalline ceramic, in order to enclose a pressure chamber. These measuring membranes have usually a membrane thickness of one or more millimeters.

Ceramic pressure sensors offer the advantage that the ceramic measuring membrane can, due to the high mechanical and chemical durability of ceramic, be exposed directly to a medium under a pressure to be measured. Ceramic pressure sensors can, accordingly, be applied without requiring the interposing of a diaphragm seal filled with a pressure transfer liquid.

For this, classical ceramic pressure sensors are usually secured by means of a sensor mounting, which includes a clamping apparatus, in the case of which an outer edge region of the pressure sensor is clamped on the measuring membrane in axial direction extending in parallel with a surface normal in such a manner that a membrane region surrounded externally on all sides by a membrane edge of the membrane clamped in the clamping apparatus is contactable through an opening of the sensor mounting with the medium having the pressure to be measured. Examples of this are described, e.g., in DE 103 34 854 A1 and DE 102 27 479 A1.

In the case of these pressure measuring devices, there is required, clamped between the membrane edge and an element of the clamping apparatus externally surrounding the opening, a sealing apparatus, which effects a sealing of a housing interior of the pressure measuring device against the medium. The pressure measuring device described in DE 102 27 479 A1 includes for this sealing an O-ring of an elastomer clamped between the membrane edge and the element of the clamping apparatus. The pressure measuring device described in DE 103 34 854 A1 includes for this, clamped between the membrane edge and the element of the clamping apparatus, a ceramic decoupling ring, on whose face facing the pressure sensitive means and on whose face facing the element, in each case, a gasket of polytetrafluoroethylene (PTFE) is arranged.

Sealing materials such as, e.g., elastomers or thermoplastics used for sealing the housing interior are, however, not diffusion tight and age with time.

This problem can be attacked, e.g., in the manner described in EP 2 860 505 A1. There, a pressure measuring device is described, comprising: a ceramic pressure sensor, which includes a ceramic measuring membrane; and a sensor mounting, by means of which the pressure sensor is secured in such a manner that a membrane region of the measuring membrane surrounded externally on all sides by a membrane edge of the measuring membrane is contactable with a medium having a pressure to be measured, wherein the sensor mounting comprises a titanium or titanium alloy mounting element, which has an opening, through which the membrane region is contactable with the medium having the pressure to be measured.

The sensor mounting described in EP 2 860 505 A1 includes a process connection of titanium or a titanium alloy, in which an opening is provided in which the pressure sensor is secured by means of a securement arrangement. The securement arrangement includes a ceramic ring connected with the membrane edge by means of a solder joint and the mounting element of titanium connected with the ceramic ring. The mounting element is embodied as a metal ring, which is connected with the process connection by means of a weld. The metal ring can be embodied as a ring shrunk on the ceramic ring and surrounding the ceramic ring externally on all sides. Alternatively, the metal ring can be embodied as a ring connected with a measuring membrane far face of the ceramic ring by means of a solder joint. In the case of both variants, the securement arrangement forms an external limiting of the opening serving for the pressure contacting, which is sealed diffusion tightly from the inner space of the cavity by the soldered joint between membrane edge and ceramic ring and the connection between the metal ring and the ceramic ring.

Disadvantageous in this case is, however, that in measurement operation soldered joints coming in contact with the medium can be attacked by corrosion. This pressure measuring device can, thus, not be employed for pressure measurement of highly corrosive media such as, e.g., oxidizing mineral acids.

Described in EP 1 329 960 A1 is a pressure sensor, which comprises a sensor chip of sapphire. Sapphire is a monocrystalline, corrosion resistant material. The sensor chip is arranged in an opening in a glass body and the opening is sealed by a cover plate of sapphire. The cover plate has a central opening, through which a sapphire-membrane of the sensor chip is contactable with pressure.

In EP 1 329 960 A1, it is mentioned that the cover plate can be connected with the chip in corrosion resistant manner without interpositioning of a joining means by making the surfaces mirror smooth and subsequently connecting chip and cover plate by keeping them pressed together while heating them. However, EP 1 329 960 A1 advises against this form of embodiment, since sapphire is, to begin with, an expensive material, and the production costs continue to increase because the connection between sensor chip and cover plate requires that the surfaces have a surface roughness of less than or equal to 0.3 nm.

Moreover, there is a concern that the measuring characteristics of the sensor chip can be degraded by the compressive pressure resulting from the pressing together and/or by stresses induced in the sensor chip by the compressive pressure, which stresses can affect the accuracy of measurement disadvantageously. In such case, sapphire as a rigid, brittle material is not, or only to a very small degree, able to absorb these stresses because as a single crystal in contrast to a polycrystalline ceramic it has no grain boundaries at which subcritical crack growth can be stopped.

Due to the above-mentioned differences between classic pressure sensors and sensor chips, methods used for encapsulation of sensor chips are not, as a rule, directly transferable to sensor mountings for securing classic pressure sensors.

Moreover, in classic ceramic pressure sensors, in the present state of the art, usually, compared with sapphire-membranes, significantly more cost effective polycrystalline ceramic membranes are applied. Polycrystalline ceramics have, however, a significantly lesser surface quality and a significantly greater surface roughness than sapphire. Thus, it appears to be extremely difficult to produce polycrystalline ceramic membranes with a surface roughness of less than or equal to 0.3 nm. The use of sapphire-membranes would, however, due to the very large dimensions of classic pressure sensors compared with sensor chips, mean a considerable cost increase.

Also the idea of compensating a surface roughness too great for performing the method described in EP 1 329 960 A1 by increasing temperature or the compressive pressure does not help here, since the ceramic pressure sensor would as a result be exposed to yet greater thermomechanical demands, which could disadvantageously affect the accuracy of measurement and even lead to damaging the sensor.

SUMMARY

It is an object of the invention to improve the corrosion resistance of pressure measuring devices of the above-mentioned type equipped with a classic ceramic pressure sensor.

For achieving the object, the invention includes a pressure measuring device, comprising: a ceramic pressure sensor, which includes a ceramic measuring membrane; and a sensor mounting by means of which the pressure sensor is secured in such a manner that a membrane region of the measuring membrane surrounded externally on all sides by a membrane edge of the measuring membrane is contactable with a medium having a pressure to be measured, wherein the sensor mounting comprises a titanium or titanium alloy mounting element, which has an opening, through which the membrane region is contactable with the medium having the pressure to be measured, wherein the membrane edge of the measuring membrane is connected directly with the mounting element of the sensor mounting by means of a diffusion weld, wherein the diffusion weld is a diffusion weld produced by means of a diffusion welding method, by which the measuring membrane present during the diffusion welding method as a separate part becomes connected with the mounting element.

Pressure measuring devices of the invention offer the advantage that via the diffusion weld a diffusion resistant and highly corrosion resistant sealing of the opening is achieved. This is especially also still the case when the measuring membrane has a comparatively rough surface. The direct connection of the invention between the membrane edge and the mounting element effected by the diffusion weld without interpositioning of a joint material, without interpositioning of a seal of an elastomer or a thermoplastic and without interpositioning of a ceramic component achieves that the corrosion resistance of the connection, in total, is essentially limited only by the very high corrosion resistances of the measuring membrane and the mounting element.

A further advantage is that the diffusion weld has a relatively high pressure resistance. This high pressure resistance is especially achieved by diffusion welding the measuring membrane, in the form of a separate part, with the mounting element. This offers the additional advantage that the pressure sensor is not exposed in total to the demands of a diffusion welding method. In this way, also pressure sensors can be used, which cannot withstand these demands. Moreover, this prevents that the measuring characteristics of the pressure sensor are degraded by the demands of the diffusion welding method.

A first further development of pressure measuring devices of the invention is characterized by features including that the pressure sensor comprises at least one sensor component arranged on a diffusion weld far face of the measuring membrane.

A first variant of pressure measuring devices of the invention is characterized by features including that the pressure sensor is embodied as a freestanding component secured exclusively by means of the diffusion weld.

A second variant of pressure measuring devices of the invention is characterized by features including that the sensor mounting includes, arranged on a diffusion weld far, rear face of the pressure sensor, a sensor support, which is embodied in such a manner that it effects a rear face support of the pressure sensor, by which the pressure resistance of the sensor mounting is increased for pressure loadings exerted through the opening on the front face of the pressure sensitive means.

A second further development of pressure measuring devices of the invention is characterized by features including that: the measuring membrane is composed of a polycrystalline ceramic, a polycrystalline oxide ceramic or polycrystalline aluminum oxide ($Al_2O_3$), has a surface roughness of greater than or equal to 0.1 μm, a membrane thickness of 0.05 mm to 3 mm, and/or a membrane diameter of greater than or equal to 17 mm; and/or the mounting element is composed of titanium or a titanium alloy, wherein the titanium alloy has a coefficient of thermal expansion matched to a coefficient of thermal expansion of the ceramic of the measuring membrane and/or a modulus of elasticity of 100 GPa to 120 GPa.

A third further development of pressure measuring devices of the invention is characterized by features including that the mounting element includes: an opening, which is bordered externally on all sides by a wall region externally surrounding the pressure sensor on all sides and spaced from the pressure sensor, and, adjoining terminally on the wall region, a radially inwardly extending shoulder, which surrounds the opening of the mounting element externally on all sides, and, spaced from the wall region, the membrane edge of the measuring membrane is connected by means of the diffusion weld with an inner edge region of the shoulder of the mounting element.

A fourth further development is characterized by features including that the pressure measuring device includes a process connection formed as a component of the mounting element or a process connection formed as a separate component and connected with the mounting element or connected with the mounting element by means of a weld, by means of which process connection the pressure measuring device is mountable to a connection complementary to it and/or by means of which process connection the pressure measuring device is connectable to a differential pressure line connection complementary to it.

A first embodiment is characterized by features including that the pressure sensor includes an electromechanical transducer, which is embodied to convert a deflection of the measuring membrane dependent on the pressure acting on the measuring membrane into an electrical variable, based on which then the pressure to be measured is determinable by means of a measuring electronics connected or connectable to the transducer.

A second embodiment is characterized by features including that the pressure sensor includes a base body, which is connected with the measuring membrane by means of a joint to enclose a pressure chamber.

Furthermore, the invention includes a method for producing a pressure measuring device of the invention, characterized in that the measuring membrane and the mounting element or at least a portion of the mounting element to be connected with the measuring membrane by the diffusion weld are prefabricated as separate parts, and a diffusion welding method is performed, by means of which the membrane edge of the measuring membrane present as a separate part is connected with a region of the mounting element to be connected therewith by the diffusion weld, in that:
  a) an arrangement is produced, in which the membrane edge and the region of the mounting element to be connected therewith by the diffusion weld lie directly against one another; and
  b) the membrane edge and the region of the mounting element to be connected therewith are pressed against one another under vacuum or under a protective gas atmosphere by means of a compressive pressure and under the compressive pressure acting thereon are subjected to a heating process, in the case of which the arrangement is heated to a temperature, at which a diffusion process effecting the diffusion weld takes place.

A first further development of the method is characterized by features including that the arrangement is kept during the diffusion welding method over a time period from 60 minutes to 120 minutes under a compressive pressure of 1 MPa to 10 MPa at a temperature in the range from 1000° C. to 1400° C.

A second further development of the method is characterized by features including that the pressure sensor following the diffusion welding method is completed by arranging at least one sensor component on the diffusion weld far face of the measuring membrane.

A further development of the second further development of the method for producing a pressure measuring device according to the second embodiment is characterized by features including that, after performance of the diffusion welding method, the base body is arranged on the measuring membrane with interpositioning of a joint material required for producing the joint between measuring membrane and base body, and subsequently a joining method is performed, by means of which the joint between base body and measuring membrane is produced.

A further development of the latter further development is characterized by features including that: the pressure sensor comprises a capacitive, electromechanical transducer; the transducer includes a measuring electrode arranged on a membrane-facing, front face of the base body and a counter electrode arranged on a base body facing, inner face of the measuring membrane; the counter electrode is applied on the measuring membrane before measuring membrane and base body are connected together by means of the joining method; and the base body is equipped with the measuring electrode and with components required for electrical connection of the transducer to a measuring electronics, before the base body is connected with the measuring membrane by means of the joining method.

BRIEF DESCRIPTION OF THE DRAWINGS

The invention and its advantages will now be explained in greater detail based on the figures of the drawing, in which two examples of embodiments are shown. Equal elements are provided in the figures with equal reference characters. In order to be able to display elements having very different dimensions, the drawing is not always to scale. The figures of the drawing show as follows.

DETAILED DESCRIPTION

Figure 1:
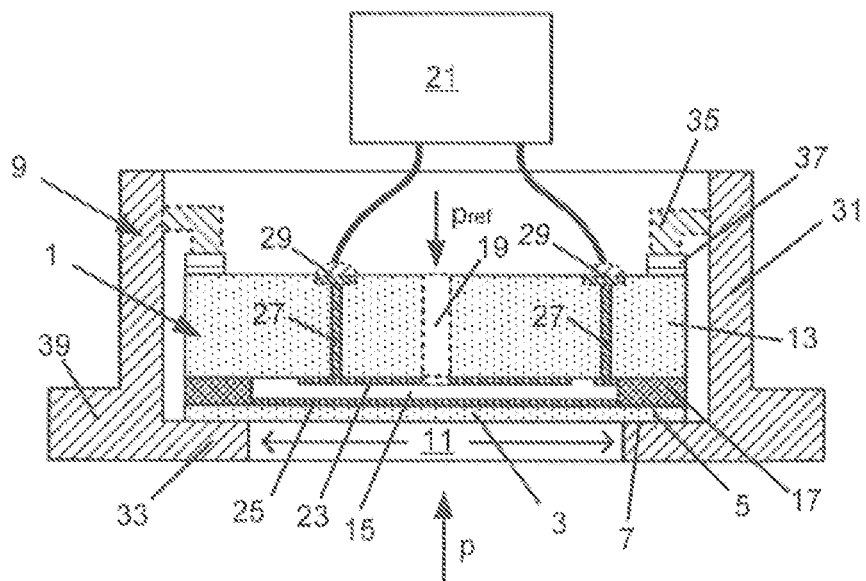
FIG. 1 shows an example of a pressure measuring device, whose mounting element includes a process connection.
Figure 2:
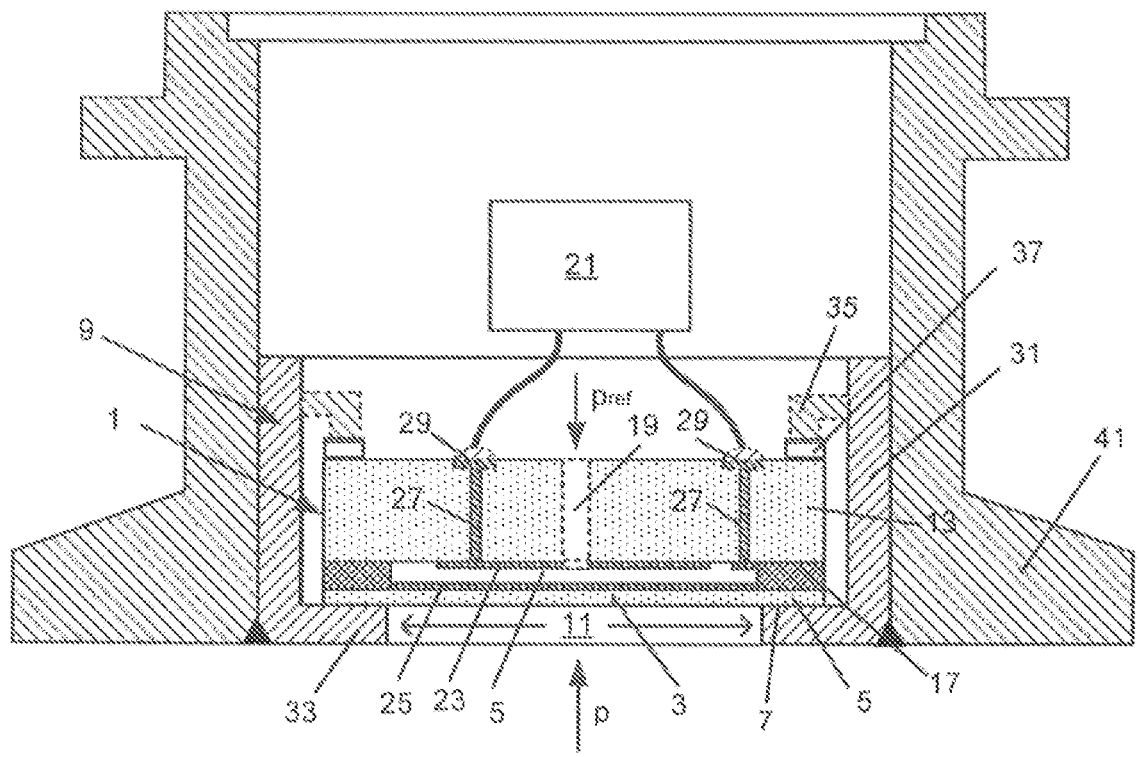
FIG. 2 shows an example of a pressure measuring device, whose mounting element is connected with a separate process connection.

FIGS. 1 and 2 show examples of pressure measuring devices of the invention. These comprise, in each case, a pressure sensor 1 and a sensor mounting. The pressure sensor 1 includes a ceramic measuring membrane 3 and is secured by means of the sensor mounting in such a manner that a membrane region of the measuring membrane 3 surrounded externally on all sides by a membrane edge 5 of the measuring membrane 3 is contactable with a medium having a pressure p to be measured.

Pressure measuring devices of the invention are characterized by features including that the membrane edge 5 of the measuring membrane 3 is connected directly with a mounting element 9 of the sensor mounting by means of a diffusion weld 7, wherein the mounting element 9 has, exposing the membrane region, an opening 11, through which the membrane region is contactable with the pressure p to be measured. In such case, the diffusion weld 7 is embodied as a diffusion weld 7 produced by means of a diffusion welding method. The diffusion welding method connects the measuring membrane 3, present as a separate part, with the mounting element 9, wherein the mounting element 9 is composed of titanium or a titanium alloy. Suited as titanium alloy are, for example, titanium alloys that have a coefficient of thermal expansion matched to a coefficient of thermal expansion of the ceramic of the measuring membrane 3. In reference to producing the diffusion weld 7, especially suitable are titanium alloys, which—such as titanium also—have a comparatively small modulus of elasticity from 100 GPa to 120 GPa. Examples of such alloys are Ti-6Al-4V and Ti-6Al-2Sn-4Zr-6Mo.

The invention includes the above-mentioned advantages. Moreover, the aforementioned titanium based materials offer the advantage that the coefficient of thermal expansion of the mounting element 9 composed thereof is very similar to the coefficients of thermal expansion of polycrystalline ceramics such as, e.g., oxide ceramics such as, e.g., aluminum oxide ($Al_2O_3$), usually applied for producing ceramic measuring membranes 3, so that in measurement operation thermomechanical stresses acting both on the diffusion weld 7 as well as also via the diffusion weld on the measuring membrane 3 are comparatively small. Moreover, the aforementioned titanium based materials offer the advantage that they are very much more elastic than ceramic or sapphire and, thus, are able, at least partially, to absorb thermomechanical stresses, which the pressure measuring device is exposed to in use, resulting from temperature changes.

Individual components of pressure measuring devices of the invention can have different embodiments applied individually or in combination with one another. Examples for this will now be described based on the figures.

Thus, the measuring membrane 3 can be, e.g., a polycrystalline ceramic, a polycrystalline oxide ceramic or a polycrystalline aluminum oxide ($Al_2O_3$), have a surface roughness of greater than or equal to 0.1 μm, a membrane thickness of 0.05 mm to 3 mm, and/or a membrane diameter of greater than or equal to 17 mm.

Alternatively or additionally, pressure sensor 1 can additionally to the measuring membrane 3 include at least one sensor component arranged on the diffusion weld 7 far face of the measuring membrane 3. These sensor components can include, e.g. as shown in FIGS. 1 and 2, a base body 13, which is pressure tightly connected with the measuring membrane 3 to enclose a pressure chamber 15. Suited as connection is e.g. a joint 17 connecting an outer edge of the measuring membrane 3 with an outer edge of the base body 13 and surrounding the pressure chamber 15 externally on all sides. If the base body 13 is likewise of ceramic, e.g., an oxide ceramic such as, e.g., aluminum oxide ($Al_2O_3$), then suited as joint 17 is e.g. an active hard solder or braze.

Pressure sensor 1 can be embodied e.g. as an absolute pressure sensor, which metrologically registers a pressure p acting on an outer face of the measuring membrane 3. In that case, the pressure chamber 15 beneath the measuring membrane 3 is evacuated. Alternatively, the pressure sensor 1 can be embodied as a relative pressure sensor, which registers a pressure p acting on the outer face of the measuring membrane 3 relative to a reference pressure $p_{ref}$ supplied to the pressure chamber 15 via a reference pressure supply line 19 extending through the base body 13. Supply line 19 is drawn dashed in FIGS. 1 and 2 to indicate that it is an option and not present in the case of an absolute pressure sensor.

The pressure sensors 1 shown in FIGS. 1 and 2 include, in each case, an electromechanical 30 transducer, which is embodied to convert a deflection of the measuring membrane 3 dependent on the pressure p acting on the measuring membrane 3 into an electrical variable, based on which then the pressure p to be measured is determined by means of a measuring electronics 21 connected to the transducer. The capacitive transducer shown in FIGS. 1 and 2 as an example includes for this a measuring capacitor with a measured capacitance dependent on the pressure dependent deflection 35 of the measuring membrane 3. The measuring capacitor comprises a measuring electrode 23 arranged on a membrane-facing, front face of the base body 13 and a counter electrode 25 arranged on a base body 13 facing, inner face of the measuring membrane 3.

In the case of the example illustrated here, the measuring electrode 23 is connected via a contact pin 27 extending through the base body 13 with a connection 29 arranged on the membrane-far, front face of the base body 13, and via the connection 29 the measuring electrode 23 is connectable or connected to the measuring electronics 21. The counter electrode 25 is connected via the electrically conductive joint 17 bordering it and a contact pin 27 electrically conductively connected with the joint 17 and extending through base body 13 with a connection 29 arranged on the membrane-far, front face of the base body 13, and via the connection 29 the counter electrode 25 is connectable or connected to the measuring electronics 21.

Alternatively, instead of the pressure sensors 1 shown in FIGS. 1 and 2, naturally also other pressure sensors known in the state of the art, which have a ceramic measuring membrane, can be applied. These sensors can have, e.g., another mechanical construction, can be electrically connectable in other manner and/or can have an electromechanical transducer working according to another transducer principle such as, e.g., an optical or a piezoresistive transducer.

The forming of the mounting element 9 is freely selectable within comparatively broad limits. FIGS. 1 and 2 show, in this respect, examples of embodiments, in the case of which the mounting element 9 includes an opening, which is bordered externally on all sides by a wall region 31 externally surrounding the pressure sensor 1 on all sides and spaced from the pressure sensor 1. Adjoining the wall region 31 terminally is a radially inwardly extending shoulder 33, which externally surrounds on all sides the opening 11 of the mounting element 9 serving for pressure loading of the measuring membrane 3. In such case, the membrane edge 5 of the measuring membrane 3 is connected by means of the diffusion weld 7 with an inner edge region of the shoulder 33 of the mounting element 9 spaced from the wall region 31.

As already mentioned, the connection between measuring membrane 3 and mounting element 9 formed by the diffusion weld 7 has a relatively high pressure resistance. This pressure resistance is in the case of pressure measuring devices used for measuring very low pressures, or for measuring negative pressures, sufficient, in order to provide, in sufficient measure, a pressure resistant securing of the pressure sensor 1 in the pressure measuring device. In these applications, the pressure sensor 1 can be embodied as a freestanding pressure sensor 1 secured exclusively by means of the diffusion weld 7.

A pressure resistance of the sensor mounting, in given cases, desired or required due to the pressure measuring range of the pressure measuring device, going beyond the pressure resistance of the diffusion weld 7 can optionally be provided by adding to the sensor mounting a sensor support 35 arranged on a diffusion weld 7 far, rear face of the pressure sensor 1. The sensor support 35 effects a support of the pressure sensor 1 acting on its rear face, by which the pressure resistance of the sensor mounting to pressure loadings exerted through the opening 11 on the front face of the pressure sensitive means 1 is increased. In this way, pressure measuring devices of the invention can also measure comparatively large pressures p, such as e.g. pressures p of up to 60 bar and even more. FIGS. 1 and 2 show an example of a sensor support 35 drawn dashed to indicate that it is an option. Sensor support 35 comprises a pressing ring deployed at an opening 11 far end in the mounting element 9 and connected with the mounting element 9. The pressing ring acts on an outer edge of the rear face of the pressure sensor 1. This pressing ring is composed preferably of the same material as the mounting element 9 and can be connected with the mounting element 9, e.g. by a welding or by a screwed assembly. Optionally, at least one other element 37, such as e.g. a seal, a ceramic decoupling ring and/or an elastic element, can be clamped between the sensor support 35 and the outer edge of the rear face of the pressure sensor 1.

Moreover, pressure measuring devices of the invention include, preferably, a process connection 39, 41, by means of which the pressure measuring device is mountable on a connection complementary to it provided at a location of use and/or connectable to a connection of a differential pressure line complementary to it.

FIG. 1 shows an example of this, in the case of which the process connection 39 is embodied as a component of the mounting element 9. FIG. 2 shows an example, in the case of which the process connection 41 is embodied as a separate component connected with the mounting element 9. In such case, the mounting element 9 connected with the pressure sensor 1 is inserted essentially front flushly in the process connection 41.

The process connections 39, 41 shown here comprise, in each case, a flange, which is connectable with a counterflange complementary to it. Alternatively, naturally, instead of the flanges shown here, also other process connection types known in the state of the art can be used, such as e.g. connection threads.

In the case of pressure measuring devices with separate process connection 41, the process connection 41 is preferably composed of metal, e.g. of a stainless steel, and is connected with the mounting element 9 preferably by a metal connection, such as e.g. the weld shown in FIG. 2 by the triangles.

Figure 3:
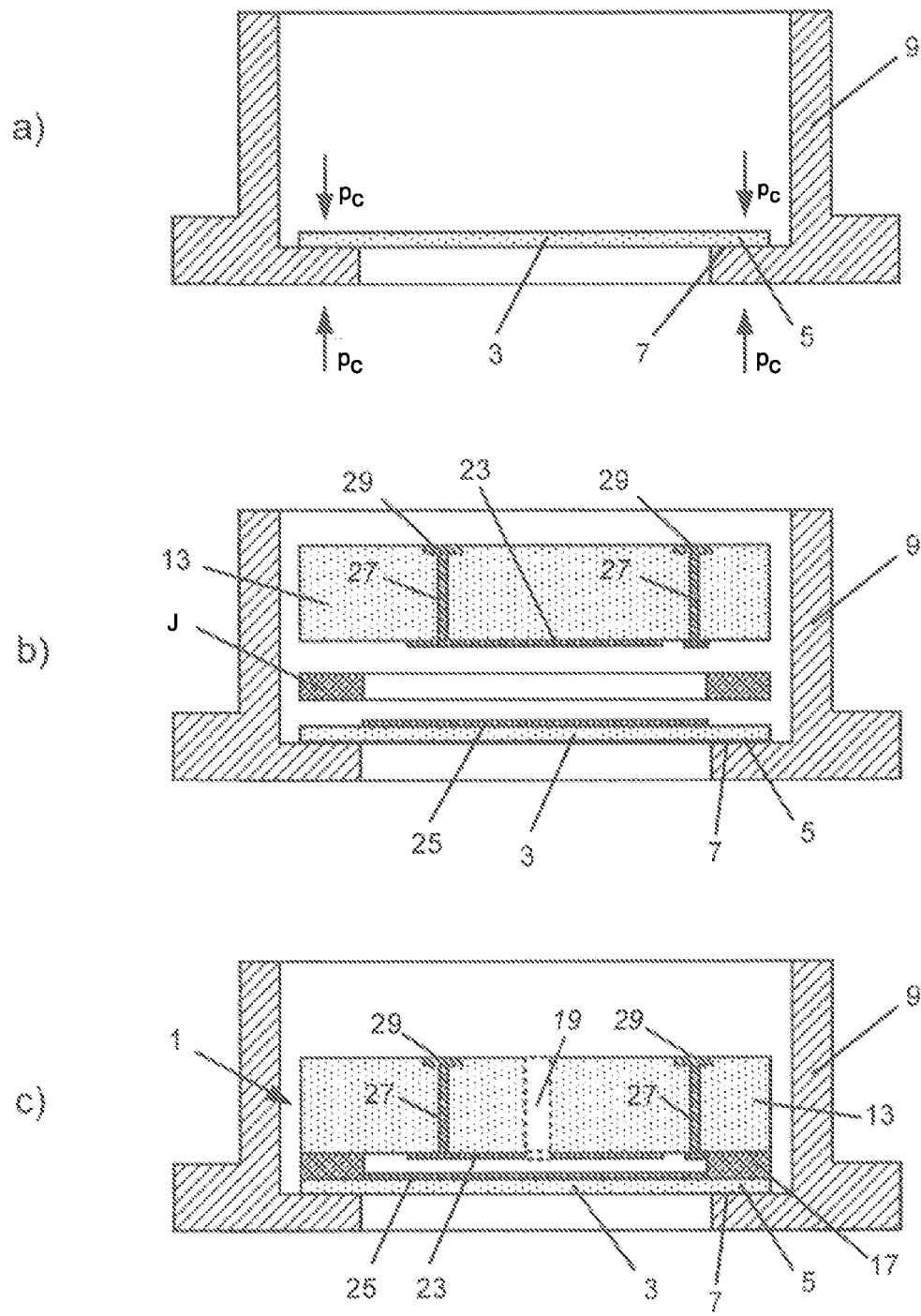
FIG. 3 shows method steps for producing a pressure measuring device using the example of the pressure measuring device of FIG. 1.

FIG. 3 shows method steps for manufacturing a pressure measuring device of the invention using the example of the pressure measuring device shown in FIG. 1. In the manufacture, the measuring membrane 3 and the mounting element 9, or at least a portion of the mounting element 9 to be connected with the measuring membrane 3 by the diffusion weld 7, are prefabricated as separate parts. Then, a diffusion welding method is performed, by means of which the measuring membrane 3 present as a separate part is connected with the mounting element 9. For this, preferably, an arrangement shown in FIG. 3a is produced, in which the membrane edge 5 and the region of the mounting element 9 to be connected therewith by the diffusion weld 7 lie directly against one another. Then, the membrane edge 5 and the region of the mounting element 9 to be connected therewith are pressed against one another under vacuum or under a protective gas atmosphere by means of a compressive pressure $p_c$ and under the compressive pressure $p_c$ acting thereon subjected to a heating process, in the case of which the arrangement is heated to a temperature, at which a diffusion process takes place effecting the diffusion weld 7.

In such case, the temperature, the compressive pressure $p_c$ and a time period, during which the arrangement is exposed to the temperature and the compressive pressure $p_c$, represent process parameters, which are adjustable in coordination with one another within certain limits. Since the measuring membrane 3 is diffusion welded as a separate part, no consideration has to be given to the thermal and mechanical capacity of the pressure sensor 1, which, depending on construction of the pressure sensor 1, can be very much less than that of the measuring membrane 3. Currently considered especially suitable is a diffusion welding method, in the case of which the arrangement is kept over a time period from 60 minutes to 120 minutes under a compressive pressure of 1 MPa to 10 MPa at a temperature in the range from 1000° C. to 1400° C.

By means of the above described method, diffusion welds 7 between measuring membranes 3 of polycrystalline ceramic, such as e.g. oxide ceramic, such as e.g. aluminum oxide ($Al_2O_3$), and the mounting element 9 of titanium can be produced, which have a helium leak tightness of less than or equal to $1 \cdot 10^{-10}$ mbar·l·s$^{-1}$.

If the pressure sensor 1 comprises additionally to the measuring membrane 3 at least one additional sensor component arranged on the diffusion weld 7 far face of the measuring membrane 3, then the pressure sensor 1 is completed following the diffusion welding method by adding these sensor components. The later completion offers the advantage that neither the sensor components nor their combinations with one another and/or with the measuring membrane are exposed to the loadings associated with the diffusion welding method, so that the pressure sensors 1 produced in this way contain comparatively low residual stresses and have accordingly a high accuracy of measurement.

For the pressure sensors 1 shown in FIGS. 1 and 2, preferably the base body 13 is arranged on the measuring membrane 3 with interpositioning of a joint material J required for producing the joint 17 between measuring membrane 3 and base body 13 in the manner shown in the exploded view in FIG. 3 b). Suited as joint material J is especially an active hard solder, or braze, which can be arranged, for example, in the form of a ring between measuring membrane 3 and base body 13. Then, a joining method, e.g. an active brazing method, is performed, by means of which then the joint 17 between base body 13 and measuring membrane 3 shown in FIG. 3c is produced.

As evident from FIG. 3 b), for producing pressure measuring devices, whose pressure sensor 1 is embodied as a capacitive pressure sensor 1, preferably the counter electrode 25 is applied on the measuring membrane 3, e.g. as a sputter deposited metal coating, before measuring membrane 3 and base body 13 are connected together. In such case, the counter electrode 25 is preferably applied after performing the diffusion welding method. Alternatively, it would, however, also be an option to apply the counter electrode 25 before performing the diffusion welding method.

Additionally in the case of capacitive pressure sensors 1, preferably, the base body 13 is equipped with the measuring electrode 23 and, in given cases, components, such as e.g. the shown here contact pins 27 and connections 29, required for electrical connection of the transducer to the measuring electronics 21, before the base body 13 is connected by means of the joining method with the measuring membrane 3.

The invention claimed is:
1. A pressure measuring device, comprising:
a pressure sensor including a ceramic measuring membrane, the measuring membrane comprising a membrane region surrounded peripherally on all sides by a membrane edge; and a sensor mounting configured to secure the pressure sensor such that the membrane region of the measuring membrane is contactable with a medium having a pressure to be measured, wherein the sensor mounting comprises a titanium or titanium alloy mounting element that includes an opening through which the membrane region is contactable with the medium, wherein the membrane edge of the measuring membrane is connected directly with the mounting element by a diffusion weld, wherein the diffusion weld is produced by a diffusion welding method by which the measuring membrane becomes joined to the mounting element.

2. The pressure measuring device of claim 1, wherein the pressure sensor includes at least one sensor component disposed on a side of the measuring membrane facing away from the diffusion weld.

3. The pressure measuring device of claim 1, wherein the pressure sensor is a freestanding component secured solely by the diffusion weld.

4. The pressure measuring device of claim 1, wherein the sensor mounting includes a sensor support disposed on a rear side of the pressure sensor facing away for the diffusion weld, the sensor support configured as to support the pressure sensor on the rear side by which support a pressure resistance of the sensor mounting is increased for pressure loads exerted through the opening on the pressure sensor.

5. The pressure measuring device of claim 1, wherein the measuring membrane comprises a polycrystalline ceramic, a polycrystalline oxide ceramic or polycrystalline aluminum oxide ($Al_2O_3$), has a surface roughness of greater than or equal to 0.1 µm, has a membrane thickness of 0.05 mm to 3 mm, and/or has a membrane diameter of greater than or equal to 17 mm, and/or wherein the mounting element comprises titanium or a titanium alloy, wherein the titanium alloy has a coefficient of thermal expansion matched to a coefficient of thermal expansion of the ceramic of the measuring membrane and/or a modulus of elasticity of 100 GPa to 120 GPa.

6. The pressure measuring device of claim 1, wherein the opening of the mounting element is bounded on all sides by a wall region as to surround the pressure sensor peripherally and spaced from the pressure sensor, and the mounting element includes a radially inwardly extending shoulder, which adjoins the wall region at an end thereof, and surrounds the opening of the mounting element, and wherein the membrane edge of the measuring membrane is connected by the diffusion weld to an inner surface of the shoulder such that the membrane edge is spaced from the wall region.

7. The pressure measuring device of claim 1, further comprising a process connection integrated with the mounting element or a process connection configured as a separate component of the mounting element and connected with the mounting element, wherein the process connection is configured to enable the pressure measuring device to be mounted to a complementary connection and/or to be mounted to a complementary differential pressure line connection complementary.

8. The pressure measuring device of claim 7, wherein the process connection is connected with the mounting element by a weld.

9. The pressure measuring device of claim 1, wherein the pressure sensor includes an electromechanical transducer configured to convert a deflection of the measuring membrane dependent on the pressure to be measured acting on the measuring membrane into an electrical variable, based on which the pressure to be measured is determined using a measuring electronics connected or connectable to the transducer.

10. The pressure measuring device of claim 1, wherein the pressure sensor includes a base body connected with the measuring membrane by a joint such that a pressure chamber is as to defined and enclosed within the pressure sensor.

11. A method for manufacturing a pressure measuring device, the method comprising:

fabricating the measuring membrane and the mounting element or at least a portion of the mounting element to be connected with the measuring membrane as separate parts;

connecting the measuring membrane to the mounting element or to the portion of the mounting element using a diffusion welding process to form a diffusion weld therebetween, wherein the membrane edge of the measuring membrane is connected to a region of the mounting element such that:

an arrangement is produced in which the membrane edge and the region of the mounting element seat directly against each other; and the membrane edge and the region of the mounting element are pressed against each other under vacuum or under a protective gas atmosphere by a compressive pressure and, under the compressive pressure acting thereon, are subjected to a heating process in which the arrangement is heated to a temperature at which a diffusion process effecting the diffusion weld occurs.

12. The method of claim 11, wherein, during the diffusion welding operation, the arrangement is kept over a time period from 60 minutes to 120 minutes under the compressive pressure, which is 1 MPa to 10 MPa, at a temperature in a range from 1000° C. to 1400° C.

13. The method of claim 11, wherein, following the diffusion welding operation, the pressure sensor is completed by arranging at least one sensor component on a side of the measuring membrane facing away from the diffusion weld.

14. The method of claim 13, further comprising, after performing the diffusion welding operation:

placing a base body on the measuring membrane such that a pressure chamber is defined and enclosed within the pressure sensor, wherein a joint material is disposed between the base body and the measuring membrane; and subsequently, joining the base body and the measuring membrane via the joint material, whereby a joint is produced therebetween.

15. The method of claim 14, wherein the pressure sensor comprises a capacitive, electromechanical transducer, which includes a measuring electrode disposed on a membrane facing, front face of the base body and a counter electrode disposed on a base body facing, inner face of the measuring membrane, wherein the method comprises applying the counter electrode on the measuring membrane before the measuring membrane and base body are joined, and wherein the base body includes the measuring electrode and components to enable an electrical connection of the transducer to a measuring electronics before the base body and the measuring membrane are joined.

* * * * *